Aug. 19, 1947.  W. H. GREEN ET AL  2,425,932

GRIT SEPARATOR

Filed Sept. 9, 1944  3 Sheets-Sheet 1

INVENTORS
Walter H. Green,
BY Herbert W. Gillard,

ATTY.

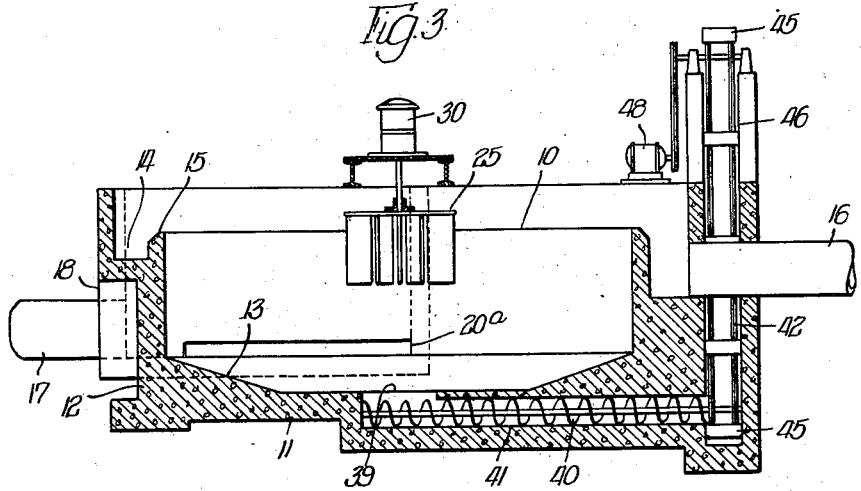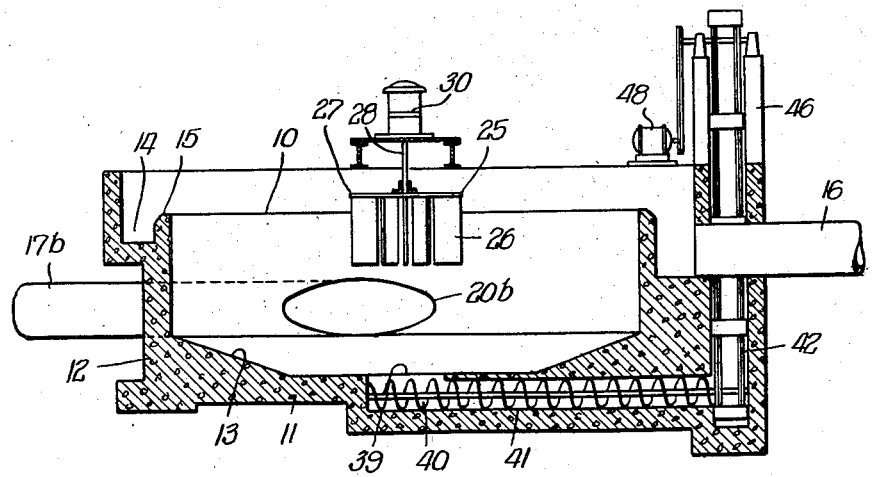

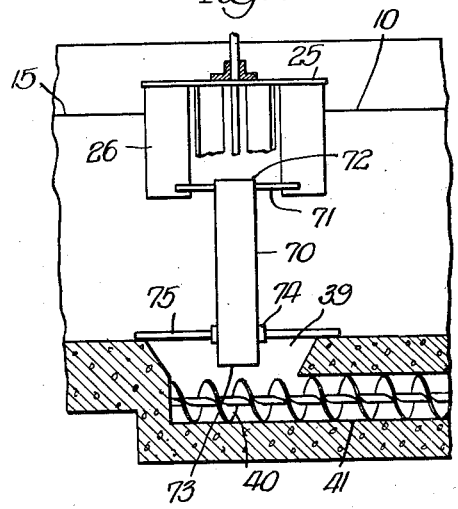
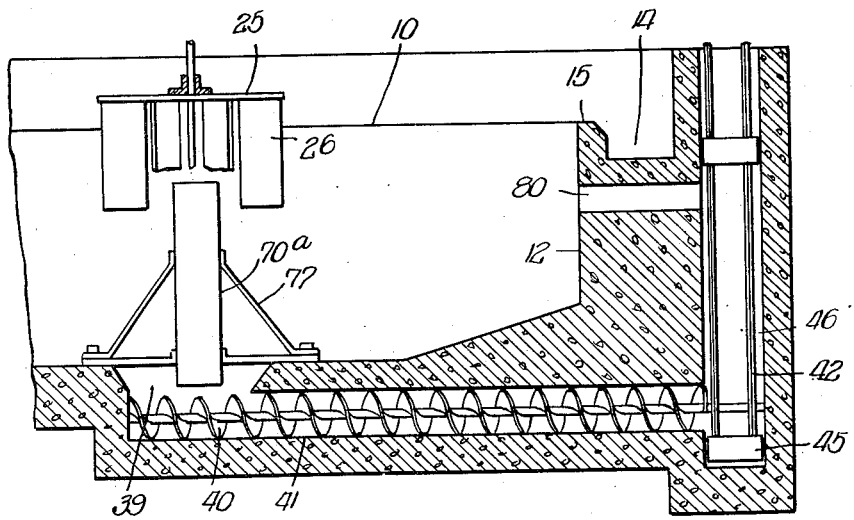

Patented Aug. 19, 1947

2,425,932

UNITED STATES PATENT OFFICE 2,425,932

GRIT SEPARATOR

Walter H. Green, Batavia, and Herbert W. Gillard, Oak Park, Ill., assignors to Infilco Incorporated, Chicago, Ill., a corporation of Delaware Application September 9, 1944, Serial No. 553,296

12 Claims. (Cl. 210—3)

This invention relates generally to a process and an apparatus for separating solids of different effective densities suspended in a liquid, the more dense being removed from the liquor while the less dense remain in suspension.

One of the objects of this invention is to separate the inorganic solids, commonly called "grit," from a flowing stream of sewage, while maintaining the putrescible organic material in suspension.

Raw sewage entering a sewage treatment plant contains many inorganic objects, such as pieces of metal, small rocks, sand, and the like, commonly spoke of as "grit," which it is desirable to remove from the sewage in order to prevent interference with subsequent sewage purification processes and to avoid injury to the equipment, such as pumps, flow meters, screenings cutters, and the like; and, since these materials are inert and will not be acted on during the treatment, to avoid burdening the plant with them. Heretofore it has been common practice to pass the entering sewage through a grit separation chamber, this being usually in the form of an elongated basin or trough, so designed as to give a flow velocity of about 0.75 to 1.25 feet per second, with a detention period of about 50 seconds. It is obvious that if the flow velocity through the grit chamber is too high, many of the lighter or finer inorganic solids will not deposit from the flowing stream of sewage. On the other hand if the flow velocity is too low, some of the putrescible organic material in the sewage will settle with the inorganic solids, whereby the grit is odorous and otherwise offensive and its disposal is therefore difficult. Since most sewage plants, particularly those handling domestic sewage, have a flow of sewage varying widely at short intervals, that is, over a range of 5 to 1 or more during a day, the flow velocity through the grit chamber tends to vary widely and outside of the range permissible for satisfactory grit separation. A variety of forms of apparatus have been proposed to overcome these difficulties, many directed to securing a more uniform velocity of flow through the grit chamber in one way or another, but none has effected enough improvement to receive more than occasional use. In practice the size of basin is commonly proportioned to an intermediate, or average, throughput rate, and poor results accepted at low and high flow rates. It has been proposed to have a plurality of elongated basins operating in parallel that go into and out of service serially with increase or decrease of flow; and also with an elongated basin, to pump back liquid from the outlet to the inlet during low flow periods. It has also been proposed to use a settling basin through which the flow normally will be sufficiently quiescent that the grit and some putrescible matter will deposit, the latter later being washed out of the grit.

It is an object of the present invention to provide a new type of grit chamber and to set up therein constant conditions effective to separate the grit from sewage while preventing the deposit of putrescible organic material, regardless of the normal wide fluctuations in the volumes of such flows.

To accomplish this end, we depart from heretofore known grit separators in several directions, and by so doing we obtain certain advantages as will be more fully shown hereinafter. For one thing, we purpose to employ a basin of such size, and retain the sewage therein for such an appreciable length of time, i. e., for a minute or more at maximum conditions of flow, that a large portion of organic solids would normally deposit under maximum conditions of flow. Then, to avoid the trouble that would otherwise result in such long detention, we propose to maintain the sewage throughout the basin in constant motion in a pattern and velocity of movement, or flow, favorable on the one hand to the subsidence of heavier solids and on the other hand to the retention and carrying out of the lighter organic solids. We propose that this circulation, or movement, be of such volume and velocity as to be, for all practical purposes, independent of, and in fact dominate, the flow caused by the incoming sewage to be treated. Furthermore, we propose to maintain such circulation in a peculiar pattern of flow. We have found that by utilizing a form of flow known as a "rotating vortex" we are able to maintain advantageous conditions in different parts of our treating basin. Such a pattern of flow is not only advantageous in separating grit from sewage and organic solids, it is conducive to the disintegration of aggregates of grits and organic matter, thus obtaining a sharper separation and a cleaner grit. In many cases this overcomes the need for a grit washer for final cleaning of the grit.

It is thus a further object of our invention, to provide in a grit separator means for maintaining a flow of sewage therein controlled as to velocity and direction, whereby the heavy inorganic solids will separate from the sewage at one place, and putrescible organic material washed therefrom, and the putrescible organic material be discharged with the effluent at another point.

It will be obvious to those skilled in the art that our process and apparatus can be utilized in the separation of other types of solid particles wherein there is a gradation of density. However, for convenience, the invention will be described in connection with the separation of grit, or inorganic materials, from sewage containing organic solids. The description of a grit separator for sewage, therefore, is to be taken as illustrative and not as a limitation of our invention.

The operation of our process and apparatus will be more readily understood by reference to the drawings, which show three preferred embodiments of our invention.

Figures 3 and 4 are vertical views of apparatus similar to that of Figures 1 and 2, but embodying other forms of sewage inlets.

Figures 5 and 6 are enlarged, partial side views of additional devices which may be used in our grit separator for scouring the organic materials from the grit.

Figure 1:
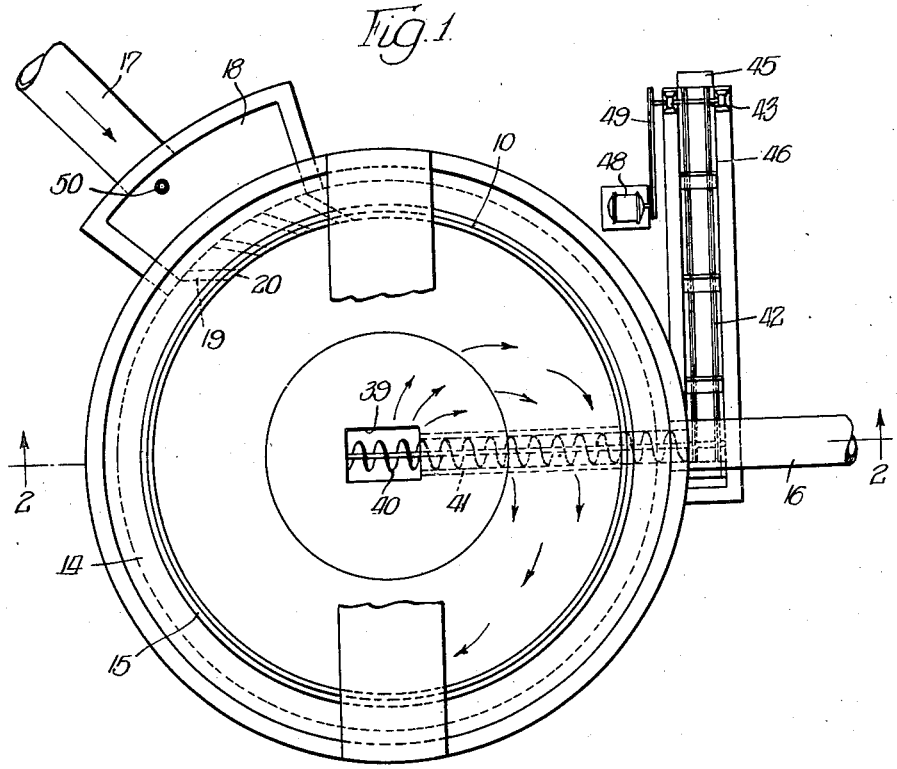
Figure 1 is a plan view of one embodiment of our invention, with the power mechanism omitted.
Figure 2:
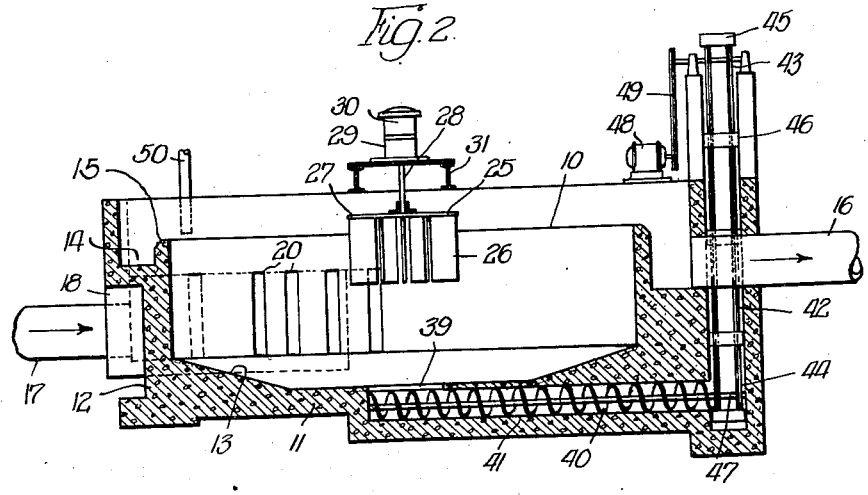
Figure 2 is a vertical cross-sectional view of the embodiment shown in Figure 1, taken along the vertical planes indicated by the line 2—2 of Figure 1, with power mechanism included.

One of our preferred forms of grit separation apparatus is shown in Figures 1 and 2. The apparatus comprises a tank 10, which may be constructed of any suitable material, such as concrete, and which may be polygonal but is preferably cylindrical. The tank 10 comprises a floor 11 and vertical wall 12. Preferably the peripheral portion of the floor 11 is sloped, as shown at 13, to prevent accumulation of solids in the angle between wall and floor, and to aid in the inward movement of deposited solids. The slope of this portion 13 does not have to be sufficient to cause solids settling thereon to slide downwardly by gravity alone for it will be understood that the velocities provided for in our apparatus, more fully described hereafter, will hydraulically move grit across the floor of the tank to the point of removal. An overflow launder 14 surrounds the upper portion of the walls 12 and is separated therefrom by a weir 15. An effluent conduit 16 leads from the launder 14. Water or sewage from which grit will be removed is introduced through an influent conduit 17. It is very desirable that the raw liquid to be treated be introduced in such a manner that currents created thereby shall not interfere with, but shall be readily absorbed in, the currents set up by the mechanical impeller. Thus we prefer to introduce the liquid to be be treated in a tangentially entering stream or streams, as shown. As shown in Figure 2, the inlet conduit 17 preferably terminates in an inlet well 18 adjacent the wall 12 of the tank. From the inlet well 18, a plurality of narrow passageways 19 lead into the tank 10, discharging tangentially to the wall of the tank, as shown at 20. As shown in Figures 2, 3 and 4, it is preferable that the inlets 20, 20a and 20b, respectively, be so positioned that the top thereof is a substantial distance below the level of the weir. By "substantial distance below the weir" we mean that the top of the inlet is sufficiently below the weir as to not materially influence the normal currents adjacent the surface of sewage in the basin 10 and especially those adjacent the weir 15 in what we call the "weiring zone," hereafter described.

While the size and proportions of the basin 10 are not sharply critical, we have found that there are preferred ranges therefor. Our experience has shown that the volumetric content of the chamber should be proportioned to the maximum rate of flow and that the capacity of the basin should be such that, at the maximum rate of flow, the time of retention will be of the order of about one and one-half minutes, or more. While results as good as those had with the ordinary type of grit chamber can be had, even at peak flows, with a somewhat smaller chamber and correspondingly smaller detention time, it is preferred that the basin be at least large enough to hold one and one-half times the maximum rate of flow per minute. There is no functional objection to having the basin larger than herein mentioned, but there is the objection to larger basins that more ground area is required, the cost of construction is correspondingly larger and the power consumption more. However, in plants where is it contemplated that a future increase of flow may be had, it will often be desirable to make the chamber oversize as far as the then present flow is concerned so as to allow for the propsective increase.

Another thing that we have found is that there usually is a preferred relation of diameter to depth. We know that the diameter can be as great as four to six times the depth, or even more, depending upon the actual size of the basin, and there are some advantages in having basins of such proportion. However, all things being considered, it is preferred that the depth, and by depth we mean the center depth but not including the grit collecting chamber, or sump 33, in the center, should be of the order of about one-fourth the diameter, or more. We have found that in the usual commercial sizes, generally better operation is realized when the depth of the basin 10 is approximately one-fourth to one-third its diameter, as in a basin of such proportion the desired flow pattern can be most easily and cheaply had.

Axially aligned in the tank 10 is a rotor, or liquid impeller 25. The figures show a preferred form of rotor which comprises a plurality of thin and relatively narrow vertical blades 26 rigidly mounted on the underside of a plate 27. The plate 27 is mounted on a shaft 28, driven through a speed reducer 29 by a suitable motor 30. The plate 27 preferably is mounted on the shaft 28 at a level above the surface of the liquid, as shown, so that the blades 26 enter the liquid but the plate 27 does not. The motor and speed reducer are supported above the tank by any suitable means, such as I-beams 31. It will be obvious to those skilled in the art that the speed reducer 39 can be provided with a suitable thrust bearing, not shown, to carrying the weight of the impeller 25 and shaft 28.

This type of rotor is preferred because, among other things, it can impart a substantial but non-turbulent flow to the liquid in the upper part of the chamber, and also because it produces a pattern of flow, sometimes called a "vortex" or "rotating vortex," to the liquid in the chamber, a type of flow we have found best adapted for our purposes. We have found that a preferred relationship exists between the diameter of the tank and the diameter of the rotor. Preferably the rotor diameter will be between about 0.2 and about 0.4 of the tank diameter, although this is not sharply critical. However, other means of maintaining the necessary circulation may be used, such as an ordinary propeller, or other pumping device, not shown. The rotor, or liquid impeller, on rotation, will cause a horizontal flow at the surface of the liquid spirally outward from the center toward the overflow weir 14. As the volume of liquid pumped or displaced by the rotor is in excess of the quantity of throughput, some of the liquid will pass downwardly along the wall 12 of the tank and inwardly across the floor 11 and rise to the rotor and be recirculated thereby. Thus the impeller shown causes a spiralling horizontal and vertical flow outwardly along the upper surface of the water then downwardly and inwardly along the floor of the tank.

Obviously the liquid leaving the rotor has both radial and tangential velocities. The path of travel is not in a straight line out to the periphery of the tank, but spirals around in the direction of rotation. It is also obvious that adjacent the weir 14 will be a zone wherein the velocity of the liquid flowing to and over the weir will dominate the flow pattern therein. The size of this zone will depend upon several factors such as the size and proportion of the tank, the amount of flow of sewage, the type of weir and the like. Obviously, it will be generally true that material suspended in the liquid entering this zone will be carried by the liquid over the weir into the launder. Intermediate the rotor and the weiring zone is the zone in which effective separation of grit from the light inorganic solids occurs, which zone for convenience we will speak of as the "separation zone." In this zone the grit particles subside a distance such that they do not enter and are not influenced by the flows in the weir zone but instead pass downward with the downward flow of sewage in the outer part of the basin. We contemplate controlling the discharge of the rotor to provide the proper velocity across this separation zone. Obviously if the velocity is too low, organic solids will not be carried out, and if it is too high, grit will be carried over into the weiring zone where the velocity of the water going over the weir will carry grit into the launder. Thus, there is a critical velocity in the separation zone, but this is not sharply critical. Normally this velocity in the separation area should be between about 0.50 to about 1.50 feet per second when treating ordinary domestic sewage but in very small basins may be somewhat lower and in large basins somewhat higher. The required velocity in this area will depend to a large extent upon the nature of the grit, or the respective densities of the solids to be separated, the kind and degree of separation desired, and the like. It will be noted that among other effects secured by the form of basin and the pattern of flow proposed, is the very advantageous one of the spreading out of the grit containing sewage over a very considerable area in the upper separation zone and more so as it approaches the weir zone and the weir proper. Thus the outflow to the weir zone is supplied by or from a very shallow depth of top liquid. As a result grit particles need to fall only a very short distance to avoid being carried out, and not through the full depth of the flowing liquid as in conventional plants. This effect is secured at both high and low rates of throughput, while at the same time the quantity and velocity of the sewage passing through this separation zone is maintained constant.

In the lower part of the basin the sewage flows inwardly under conditions much like those in the upper separation zone. Here grit particles deposit on the floor and due to the rotary and inward motion of the liquid are rolled across the floor to the grit collection chamber 39. In the center the sewage rises toward the rotor to be again discharged outwardly. Some grit particles may be carried up in this central flow and may make the circuit several times, but ultimately all particles above a certain size or effective density will deposit on the floor. Some grit brought in by the sewage will be too heavy to be carried about in the flow but will fall at once to the floor and be rolled into the central pit 39.

In this connection, we might here mention another element that is of some importance in the proper separation of grit from the putrescible organics of sewage: the ratio between what might be called the "pumping capacity" of the rotor and the volumetric capacity of the basin. Obviously if the flow set up and maintained by the rotor is to dominate or absorb that due to the inflow of sewage, as it should if the intended pattern of flow is to be maintained and best results had from our apparatus and process, then the quantity of liquid pumped by the rotor should be at least equal to the maximum rate of entry. In a basin of the preferred size, i. e. about one and one-half times the peak flow per minute, or more, a better flow pattern is provided and better results are normally secured when the entire contents of the basin are overturned about twice a minute. In other words the pumping capacity of the rotor is preferably about three times the peak flow, or more. It is obvious that pumping capacity depends not only on the size of the rotor, but also upon the speed with which it is rotated. With a rotor of the type shown in the drawing, we prefer to use a relatively large rotor, normally from about 0.2 to about 0.4 of the tank diameter, and to operate it at a relatively low speed, i. e. to provide a peripheral velocity of from about 0.5 to about 2.5 feet per second. However, a smaller rotor operated at higher speed may secure good but not always as good, results.

This circulation described is effective for scouring the organic material from the inorganic grit, particularly as it is washed across the floor, and the efficient separation or classification of the two types of particles. The grit is collected approximately at the center of the tank floor 11. Preferably, the floor will have a centrally located pit, or grit receiving chamber 39, into which the grit will deposit.

The grit so separated and concentrated can be removed by any suitable means. A preferred form of such grit removal apparatus comprises a helical screw 40, operating in a horizontal trough 41, extending from the grit collecting chamber 39, as shown in Figure 1, to outside of the wall thereof. Obviously the circulation above spoken of will cause the grit to collect in the pit 39, from which it can be removed by operation of the screw 40. Outside of the wall 12 of the tank, we provide a grit elevating mechanism, which may consist of a conveyor, as shown. Such an elevator may comprise a pair of chains 42, operating over upper sprockets 43 and lower sprockets 44 and provided with suitable blades 45. The whole assembly will preferably operate in a sloping trough 46. As shown, it is preferable that the screw conveyor 40 and the lower sprockets 44 be mounted on a single shaft 47, whereby the operation of the flights of the grit elevator, will cause rotation of the screw conveyor. The grit elevating mechanism can be driven by any suitable means such as motor 48, driving the elevator equipment by any suitable means, such as chain or belt 49.

It will be obvious that our apparatus provides a tank which is free from internal structure limiting the circulation caused by our impeller 25. Preferably the manner of inflow of liquid to be treated is such as to provide minimum interference with the flow caused by the impeller and to conform to and be readily absorbed in this flow. As indicated above, the flow caused by the impeller is considerably in excess of the throughput of sewage, and is in the form of an outwardly expanding spiral in the upper part of the liquid, from which water with light organic materials separates and flows over the weir 14. Also, in addition to the constant velocity of flow in the separation zone, we maintain a constant depth of flow therein which is particularly advantageous in securing proper separation of grit from organic solids. The heavier solids settle, assisted by the downward flow, and deposit on the floor 11 of the tank, and thence are moved to the collecting chamber 39 by the lower contracting spiral flow along the floor. The solids so collected and accumulated are readily removed from the apparatus by means of the spiral conveyor and grit elevator described.

Such an apparatus and process provides for efficient separation of grit or heavy inorganic particles from lighter material, such as the organics of sewage, regardless of the wide variation in throughput rates of liquid being treated. We control the velocities of the moving sewage in the particularly important zone of the upper horizontal flow (in the separation zone) prior to its coming under the control of liquid flowing over the overflow weir 14. As stated above the flow set up by the impeller must dominate the velocities resulting from the through flow of sewage to be treated, and preferably the velocity of flow caused by the impeller will be of the order of from about 0.5 to about 1.5 feet per second at the rotor. Such a flow will normally provide a clean grit that will not require washing before its disposal. However, if preferred, a grit washing apparatus of known construction can be installed in the trough 46 to wash the grit being pushed up by the flights of the grit elevator.

In some installations it is desirable to add a chemical coagulant to sewage, in order to aggregate minute organic particles into particles of sufficient size to settle readily. In the conventional plant the sewage is first passed through the grit chamber, then through a separate flocculating basin in which the sewage is dosed with a chemical such as alum, and subjected to mild agitation to aggregate the small particles. With our invention we are able to entirely eliminate the costly flocculating apparatus. We have found that if the coagulant is added to the sewage as it enters our grit separator, the circulation maintained in the basin is sufficient to cause a substantial aggregation of the floc and is also sufficient to prevent the deposit of such flocculated particles therein. Thus our grit separator can also be used as a flocculating device by merely adding the necessary chemical to the sewage therein. Preferably, the necessary chemical will be added to the sewage in the inlet well 18, as by chemical feed line 50, discharging thereinto. The dosed sewage passes directly into the basin 10, in which the circulation caused by the rotor 25 provides the necessary agitation for good flocculation.

Figure 3 illustrates another embodiment of an inlet conduit suitable for our apparatus. The inlet conduit 17 discharges into an inlet well 18, the same as shown in Figures 1 and 2, which communicates with the interior of the basin 10 through a long horizontal slot 20a, located in the wall of the tank adjacent the bottom thereof. It is preferred that the slot 20a be placed in the lower portion of the tank, preferably just at the level of the top of the sloping portion 13 of the floor, so that the inflow of sewage will not disturb the flow pattern at the upper surface of liquid in the basin.

Figure 4 shows another form of inlet which is sometimes satisfactory but which generally is not as desirable as those shown in Figures 1 to 3, inclusive. In this embodiment the inlet conduit 17b discharges directly and tangentially into the interior of the tank through a single inlet opening 20b of the same size as the inlet conduit 17b. If this type of inlet is used, it is also desirable that it be placed as low in the tank as possible in order to avoid interference with the normal flow pattern at the upper surface of the sewage in the basin 10.

In this connection it will be understood that in order to assimilate the flow of incoming sewage in the maintained circulation, the inlet must be located a substantial distance below the level of the weir. Also, the size and shape of the inlet must be such as to keep the velocity of flow therethrough as low as possible, perferably to about one foot per second, or less. For this reason the inlet shown in Figure 4 will ordinarily not be satisfactory although it can be used when the sewage flow is small.

Figures 5 and 6 illustrate forms of a grit washing device that we propose in conjunction with our invention. In principle the washer comprises a vertical pipe extending from the interior of the grit collecting chamber 39 up to an inner portion of the rotor 25, whereby an enforced flow of sewage is caused to pass down into the grit receiving pit 39 over the grit contained therein and upwardly into the center of the rotor. Figure 5 shows one such construction in which a pipe 70 is suspended from the blades 26 of the rotor 25 by any suitable means such as by bars 71 and revolves therewith. The upper end 72 of the pipe preferably terminates at an intermediate level of the rotor blades 26 and the lower end 73 extends downwardly into the grit sump 39. If desired, the lower end of the pipe 70 may be held against sway by a bearing 74 supported by any suitable means, such as braces 75, although this is not necessary. It will be obvious to those skilled in the art that the rotation of the rotor 25 will cause what is commonly spoken of as "negative head" at the axis of the rotor of appreciable amount and in practice this may be an inch or more. A negative head of one inch could be used to cause a flow of a velocity of about 2 feet per second through the pipe 70, thereby causing a considerable flow of sewage down into the grit sump 39 and up through the pipe 70, thereby washing and scouring organics from the grit. The diameter of the pipe may be chosen according to the flow desired. The pipe 70 does not need to rotate with the rotor 25 but may be stationary as shown in Figure 6.

The structure of Figure 6 increases the washing effect on the grit. In this embodiment a passageway 80 connects the interior of the chamber 10 with the sloping trough 46 of the grit elevator or conveyor. The passageway 80 is located as close to the surface of the liquid as possible. In this embodiment the vertical pipe 70a is shown as stationary, being supported by suitable braces or supports 77. The pipe 70a, as was true of the pipe 70, in Figure 5, extends from a level within the grit sump 39, upwardly to an elevation intermediate the ends of blades 26 of the rotor 25. With the construction shown in this figure, the negative head within the rotor 25 is directly communicated to the grit trough 41 by the pipe 70a. A portion of this negative head will be communicated to the interior of the tank through the conveyor trough, around the blades of the ribbon conveyor 40, into the sloping trough 46, and thence by way of conduit or passageway 80 to the interior of the tank. This causes a flow of substantial volume and velocity through the conduit 80 into the trough 46 thence through trough 41 into the grit sump 39 and upwardly through the pipe 70a, to the interior of the rotor, thus washing the grit in the conveyor as well as in the pit. It will be understood in this connection that the grit conveyor ordinarily does not operate continuously but usually need be operated only a small portion of the time. However, there will be a continuous flow of liquid through the grit by either embodiment of Figure 5 or 6, which will effectively remove light material which may deposit with the grit. By means of the cleaning devices shown in these two figures, it is possible to further clean the grit before or as it is removed from the basin by the conveyor.

It will be understood that the embodiments shown are illustrative of the forms of our invention and that our apparatus is not limited to the specific forms disclosed. It will also be understood that our process and apparatus can be used for the separation or classification of other solid particles and is not necessarily limited to the separation of inorganic grit from sewage.

We claim:
1. In apparatus for separating grit from a flowing stream of sewage while retaining organic solids therein, a treating basin free of internal structure substantially limiting circulation therein and having a diameter greater than its depth, an inlet opening through which raw sewage is introduced to said basin, a peripheral weir over which treated sewage leaves said basin, the top of said inlet opening being spaced a substantial distance below the level of said weir, a rotor member coaxially aligned in said basin, means to effect rotation of said rotor member, said rotor member being so formed and so positioned in said basin as on rotation thereof to cause a non turbulent and low velocity outward horizontal flow of sewage in the basin at the level of said weir, a grit receiving chamber in the floor of said basin, a conveyor mechanism extending from said chamber to a point above the level of said weir and means to drive said conveyor mechanism.

2. In apparatus for separating grit from a flowing stream of sewage while retaining organic solids therein, a treating basin free of internal structure substantially limiting circulation therein and having a diameter greater than its depth, an inlet well adjacent said basin, a sewage inlet discharging into said inlet well, a chemical feeding means discharging into said inlet well, a passageway from said inlet well discharging into said basin adjacent the bottom thereof, a peripheral outlet weir, an impeller member coaxially aligned in said basin, means to effect rotation of said impeller member, said impeller member being so formed and so positioned in said basin as on rotation thereof to cause a non turbulent outward horizontal flow of sewage in the basin at the level of said weir, a grit receiving chamber in the floor of said basin, a conveyor mechanism extending from said chamber to a point above the level of said weir and means to drive said conveyor mechanism.

3. Apparatus for separating grit from a flowing stream of sewage while retaining organic solids therein comprising a treating basin free of internal structure substantially limiting circulation therein and having a diameter greater than its depth, a peripheral weir adjacent the top of said basin, an inlet discharging tangentially through a wall of said basin, the top of said inlet opening being spaced a substantial distance below the level of said weir, a rotor member coaxially aligned in said basin, means to effect rotation of said rotor member, said rotor member being so formed and so positioned in said basin as on rotation thereof to cause an outward horizontal flow of sewage in the basin at the level of said weir with a velocity of between about one-half and about one and one-half feet per second, a grit receiving chamber in the floor of said basin, a conveyor mechanism extending from said chamber to a point above the level of said weir and means to drive said conveyor mechanism.

4. Apparatus for separating grit from a flowing stream of sewage while retaining organic solids therein comprising a treating basin free of internal structure substantially limiting circulation therein and having a diameter greater than its depth, said basin being of a size sufficient to hold at least about one and one-half times the maximum inflow of sewage per minute, a peripheral overflow weir, an inlet opening through which raw sewage is introduced to said basin, the top of said inlet opening being spaced a substantial distance below the level of said weir, a rotor member coaxially aligned in said basin, means to effect rotation of said rotor member, said rotor member being so formed and so positioned in said basin as on rotation thereof to cause an outward horizontal flow of sewage in the basin at the level of said weir with a velocity of between about one-half and about one and one-half feet per second, a grit receiving chamber in the floor of said basin, a conveyor mechanism extending from said chamber to a point above the level of said weir and means to drive said conveyor mechanism.

5. Apparatus for separating grit from a flowing stream of sewage while retaining organic solids therein comprising a treating basin free of internal structure substantially limiting circulation therein and having a diameter about three times its depth, a peripheral outlet weir, an inlet opening through which raw sewage is introduced to said basin, the top of said inlet opening being spaced a substantial distance below the level of said weir, a rotor member coaxially aligned in said basin, means to effect rotation of said rotor member, said rotor member being so formed and so positioned in said basin as on rotation thereof to cause an outward horizontal flow of sewage in the basin at the level of said weir with a velocity of between about one-half and about one and one-half feet per second, a grit receiving chamber in the floor of said basin, a conveyor mechanism extending from said chamber to a point above the level of said weir and means to drive said conveyor mechanism.

6. Apparatus for separating grit from a flowing stream of sewage while retaining organic solids therein comprising a treating basin free of internal structure substantially limiting circulation therein and having a diameter greater than its depth, a peripheral outlet weir, an inlet opening through which raw sewage is introduced to said basin, the top of said inlet opening being spaced a substantial distance below the level of said weir, an impelling member coaxially aligned in said basin, said impelling member having an impelling capacity of about three times the maximum inflow of sewage to be treated at a velocity of flow of about one foot per second and being so formed and so positioned in said basin as on rotation thereof to cause an outward horizontal flow of sewage in the basin at the level of said weir, means to effect rotation of said rotor member, a grit receiving chamber in the floor of said basin, a conveyor mechanism extending from said chamber to a point above the level of said weir and means to drive said conveyor mechanism.

7. Apparatus for separating grit from a flowing stream of sewage while retaining organic solids therein comprising a treating basin free of internal structure substantially limiting circulation therein and having a diameter greater than its depth, an inlet opening through which raw sewage is introduced to said basin, a peripheral weir over which treated sewage leaves said basin, the top of said inlet opening being spaced a substantial distance below the level of said weir, a rotor member coaxially aligned in said basin, said rotor member being so formed and so positioned in said basin as on rotation thereof to cause an outward horizontal flow of sewage in the basin at the level of said weir with a velocity of about one foot per second, means to effect rotation of said rotor member, a grit receiving chamber in the floor of said basin, a conduit extending from said chamber to adjacent said rotor member, a conveyor mechanism extending from said chamber to a point above the level of said weir and means to drive said conveyor mechanism.

8. A hydraulic grit separating apparatus comprising a tank free of internal structure substantially limiting circulation therein and having a diameter about three times the depth thereof and being of a size sufficient to hold at least one and one-half times the maximum inflow of liquid per minute, an inlet opening adjacent the bottom of said tank discharging tangentially into said tank, an overflow weir adjacent the upper peripheral portion of said tank, a rotor co-axially aligned in said tank comprising a vertical shaft, a horizontal plate mounted on said shaft adjacent the level of said weir and a plurality of narrow vertically extending blades mounted on the under side of said plate, said rotor being of such size as on rotation thereof to cause a flow of liquid about three times the maximum inflow of liquid to be treated per minute at a velocity of flow of about one foot per second, a prime mover operatively connected to said shaft, a grit collecting chamber on the floor of said tank, a grit conveyor mechanism extending from said chamber to an elevation above the elevation of the overflow weir, and means to drive said conveyor mechanism.

9. A hydraulic grit separating apparatus comprising a tank free of internal structure substantially limiting circulation therein and having a diameter greater than its depth, an overflow weir adjacent the upper portion of said tank, an inlet opening through which liquid containing grit is introduced into said tank, the top of said inlet opening being spaced a substantial distance below the level of said weir, a rotor co-axially aligned in said tank comprising a vertical shaft, a horizontal plate mounted on said shaft adjacent the level of said weir and a plurality of vertically extending blades peripherally mounted on the underside of said plate, the path of travel of the peripheral edges of said blades being not greater than about four-tenths of the diameter of the tank, a prime mover operatively connected to said shaft, a grit collecting chamber in the floor of said tank, a conduit leading upwardly from said chamber to a level intermediate the ends of said blades and interiorly of the paths of rotation thereof, grit impelling means extending from said chamber to an elevation above the elevation of the overflow weir, and means to drive said impelling means.

10. An apparatus for separating grit from a flowing stream of water comprising a tank free of internal structure limiting circulation therein and having a floor and side wall, an inlet adjacent the floor of said tank for introducing water containing grit thereinto, an overflow weir on said wall, a vertical shaft co-axially aligned in said tank, a prime mover operatively connected to said shaft, a liquid impeller on said shaft, a grit collecting chamber on the floor of said tank adjacent the center thereof and means for conveying grit leading from said chamber to a point outside of said tank.

11. A process for separating grit from sewage comprising maintaining a body of sewage undergoing treatment having a diameter greater than its depth, introducing sewage to be treated into the said body at a substantial distance below the surface thereof, mechanically maintaining in said body a circulation of a volume considerably in excess of the volume of the sewage entering to be treated, said circulation comprising an expanding spiral flow adjacent the upper surface of sewage in said body having a velocity of between about one-half and about one and one-half feet per second, an outer downward flow, an inward spiral flow at the bottom of said body, and an upward flow at the center of the tank, removing sewage from said body adjacent the upper peripheral surface thereof, collecting grit adjacent the center of said lower spiral flow and removing grit from the point of collection to an elevation above the level of said body.

12. A process for separating grit from a flowing stream of sewage while retaining organic solids therein which comprises maintaining in a tank a body of sewage undergoing treatment having a volume sufficiently greater than the inflow of sewage that variations in such inflow will not materially affect the velocity of flow in said tank; applying mechanical impelling energy to the contents of said tank sufficient to cause a non-turbulent circulation of the contents of said tank upwardly adjacent the center of said tank, thence outwardly at the surface of the body of sewage, thence downwardly along the periphery of the tank, and thence inwardly along the floor of said tank, said circulation having a velocity approaching the periphery of said tank of about one foot per second; introducing sewage containing grit into said body of sewage a substantial distance below said surface of the body of sewage, the velocity of said introduced sewage being sufficiently low as to not interfere with the flow of sewage at the surface of the body of sewage; weiring grit-free sewage from the surface of the body of sewage at the periphery of the tank; collecting grit at the central portion of the floor of said tank; and conveying said collected grit to a point outside of said tank.

WALTER H. GREEN.
HERBERT W. GILLARD.

REFERENCES CITED

The following references are of record in the file of this patent:

UNITED STATES PATENTS

| Number | Name | Date |
|---|---|---|
| 2,186,371 | Durdin, Jr. | Jan. 9, 1940 |
| 2,266,097 | Tolman | Dec. 16, 1941 |
| 1,301,544 | Crombie | Apr. 22, 1919 |
| 1,686,203 | Coe | Oct. 2, 1928 |
| 1,716,228 | Horne | June 4, 1929 |
| 2,342,024 | Walker | Feb. 15, 1944 |
| 2,136,903 | Humphreys et al. | Nov. 15, 1938 |
| 2,306,026 | Scott | Dec. 22, 1942 |
| 2,308,670 | Bolton | Jan. 19, 1943 |
| 2,360,551 | Durdin, 3d | Oct. 17, 1944 |
| 1,131,222 | Dorr | Mar. 9, 1915 |
| 1,211,828 | Dorr | Jan. 9, 1917 |
| 2,020,617 | Nordell | Nov. 12, 1935 |
| 1,997,161 | Weber | Apr. 9, 1935 |
| 2,202,475 | Wileman | May 28, 1940 |
| 1,071,917 | Hendryx | Sept. 2, 1913 |
| 1,422,514 | Arbuckle | July 11, 1922 |